US012597027B2

(12) United States Patent
Hasan et al.

(10) Patent No.: US 12,597,027 B2
(45) Date of Patent: Apr. 7, 2026

(54) SYSTEMS FOR DESCRIBING UNKNOWN ACCESS MANAGEMENT EVENTS USING IDENTITY TAGS AND RELATED TRANSACTION CHAINS

(71) Applicant: T-Mobile USA, Inc., Bellevue, WA (US)

(72) Inventors: Mirmd Rashedul Hasan, Renton, WA (US); Pablo Medeiros Dominguez, Redmond, WA (US); Nilay Srivastava, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 94 days.

(21) Appl. No.: 18/592,315

(22) Filed: Feb. 29, 2024

(65) Prior Publication Data

US 2025/0278721 A1     Sep. 4, 2025

(51) Int. Cl.
*G06Q 20/38* (2012.01)
*G06F 21/31* (2013.01)

(52) U.S. Cl.
CPC ........... *G06Q 20/389* (2013.01); *G06F 21/31* (2013.01)

(58) Field of Classification Search
None
See application file for complete search history.

(56) References Cited

U.S. PATENT DOCUMENTS 6,639,975 B1    10/2003   Oneal et al.
7,620,630 B2    11/2009   Lloyd et al.

7,657,887 B2    2/2010    Kothandaraman et al.
7,756,822 B2    7/2010    Danner et al.
7,761,591 B2    7/2010    Graham
7,865,459 B2    1/2011    Zimmerer et al.
7,917,651 B2    3/2011    Khan et al.
8,275,632 B2    9/2012    Awaraji et al.
8,327,441 B2    12/2012   Kumar et al.
8,516,554 B2    8/2013    Chalana et al.
(Continued)

FOREIGN PATENT DOCUMENTS

DE    202013007090 U1    10/2013
DE    102013022434 B3    3/2021
(Continued)

*Primary Examiner* — Paul S Schwarzenberg
(74) *Attorney, Agent, or Firm* — Perkins Coie LLP

(57) ABSTRACT

The technology includes a system to describe access management events. The system monitors transactions performed by layers of an Identity Provider service (IDP). Each layer corresponds to an Application Programming Interface (API). The system captures output from the layers in a dynamic record. The output includes timestamps, names of layers, and principals responsible for calling layers. The system determines related transactions by tagging output with identity tags based on principals, and grouping transactions based on common identity tags. The system chains related transactions into lists by comparing identity tags and timestamps and determining orders based on proximate timestamps. The system determines access management events based on names of layers from lists of chained transactions. The system generates descriptions of these events for display to auditors by using language models which have been provided input from the dynamic record.

20 Claims, 7 Drawing Sheets

(56) References Cited

U.S. PATENT DOCUMENTS

| | | | |
|---|---|---|---|
| 8,650,226 | B2 | 2/2014 | Bobick et al. |
| 8,738,428 | B2 | 5/2014 | Magowan et al. |
| 9,049,259 | B2 | 6/2015 | Rathod |
| 9,092,825 | B2 | 7/2015 | Hansen |
| 9,430,264 | B2 | 8/2016 | Tang et al. |
| 9,553,944 | B2 | 1/2017 | Selitser et al. |
| 9,706,011 | B2 | 7/2017 | Smedberg et al. |
| 9,712,576 | B1 | 7/2017 | Gill |
| 9,978,045 | B2 | 5/2018 | Kapoor |
| 10,001,896 | B2 | 6/2018 | Javed Lal Mohammed Ameerjan et al. |
| 10,025,802 | B2 | 7/2018 | Vermeulen et al. |
| 10,104,121 | B2 | 10/2018 | Xie et al. |
| 10,178,067 | B1 | 1/2019 | Kumar et al. |
| 10,310,723 | B2 | 6/2019 | Rathod |
| 10,984,016 | B2 | 4/2021 | Gunther |
| 11,030,666 | B2 | 6/2021 | Ketchel et al. |
| 11,102,232 | B2 | 8/2021 | Kozloski et al. |
| 11,150,939 | B2 | 10/2021 | Mathur et al. |
| 11,409,590 | B2 | 8/2022 | Yuvaraj et al. |
| 11,468,081 | B2 | 10/2022 | Muzik et al. |
| 11,483,333 | B2 | 10/2022 | Ubriani et al. |
| 11,562,812 | B2 | 1/2023 | Bulich et al. |
| 11,580,549 | B2 | 2/2023 | Benkreira et al. |
| 11,610,261 | B2 | 3/2023 | Cella |
| 11,625,772 | B1 | 4/2023 | Hendry et al. |
| 11,647,047 | B2 | 5/2023 | Rotem et al. |
| 11,736,496 | B2 | 8/2023 | Rotem et al. |
| 11,823,089 | B2 | 11/2023 | Gunther |
| 11,823,201 | B2 | 11/2023 | Wintle et al. |
| 11,824,864 | B2 | 11/2023 | Padmanabhan et al. |
| 2004/0006537 | A1 | 1/2004 | Zelechoski et al. |
| 2004/0260719 | A1 | 12/2004 | Giraud-sauveur et al. |
| 2005/0043998 | A1 | 2/2005 | Bross et al. |
| 2007/0083424 | A1 | 4/2007 | Lang et al. |
| 2008/0015916 | A1 | 1/2008 | Cossey et al. |
| 2011/0153368 | A1 | 6/2011 | Pierre et al. |
| 2011/0258005 | A1 | 10/2011 | Fredericks et al. |
| 2013/0117444 | A1 | 5/2013 | Sharma et al. |
| 2013/0185228 | A1 | 7/2013 | Dresner |
| 2014/0067702 | A1 | 3/2014 | Rathod |
| 2015/0127628 | A1 | 5/2015 | Rathod |
| 2016/0255139 | A1 | 9/2016 | Rathod |
| 2016/0364277 | A1 | 12/2016 | Anderson |
| 2018/0063143 | A1* | 3/2018 | Wilson .................... H04L 67/60 |
| 2018/0211202 | A1 | 7/2018 | Ynion |
| 2018/0342171 | A1 | 11/2018 | Darnell et al. |
| 2019/0258986 | A1 | 8/2019 | Nguyen et al. |
| 2019/0261169 | A1* | 8/2019 | Kamal ............... H04L 63/0807 |
| 2020/0026871 | A1* | 1/2020 | Mikhailov ........... G06F 16/258 |
| 2020/0242174 | A1 | 7/2020 | Biran et al. |

| | | | |
|---|---|---|---|
| 2021/0073819 | A1 | 3/2021 | Hernandez et al. |
| 2022/0051270 | A1 | 2/2022 | Benkreira et al. |
| 2022/0130526 | A1 | 4/2022 | Slattery |
| 2022/0172174 | A1 | 6/2022 | Barcelos |
| 2022/0188822 | A1 | 6/2022 | Guzhevskiy et al. |
| 2022/0230508 | A1 | 7/2022 | Simons |
| 2022/0253776 | A1 | 8/2022 | Ramaratnam et al. |
| 2022/0292543 | A1 | 9/2022 | Henderson |
| 2022/0301077 | A1 | 9/2022 | Laserson |
| 2022/0357979 | A1 | 11/2022 | Chennoor |
| 2023/0077960 | A1* | 3/2023 | Robinson-Morgan ...................... H04L 63/00 709/224 |
| 2023/0078784 | A1 | 3/2023 | Mee |
| 2023/0091965 | A1 | 3/2023 | Cheung et al. |
| 2023/0093873 | A1 | 3/2023 | Minar et al. |
| 2023/0098747 | A1 | 3/2023 | Vijayaraghavan |
| 2023/0133354 | A1 | 5/2023 | Anzalone et al. |
| 2023/0316261 | A1* | 10/2023 | Agbamu .................. G06N 3/09 705/67 |
| 2023/0319092 | A1* | 10/2023 | Zeng ................. G06Q 10/06316 726/23 |
| 2023/0370442 | A1 | 11/2023 | Dykes et al. |
| 2023/0421562 | A1* | 12/2023 | Hakim .................... H04L 41/16 |

FOREIGN PATENT DOCUMENTS

| | | | |
|---|---|---|---|
| EP | 1316035 | A1 | 6/2003 |
| EP | 1449128 | A1 | 8/2004 |
| EP | 2767110 | A1 | 8/2014 |
| EP | 3014539 | A1 | 5/2016 |
| EP | 3014555 | A2 | 5/2016 |
| KR | 20020064469 | A | 8/2002 |
| KR | 102194031 | B1 | 12/2020 |
| WO | 0219063 | A2 | 3/2002 |
| WO | 0227426 | A2 | 4/2002 |
| WO | 2011113121 | A1 | 9/2011 |
| WO | 2012160567 | A1 | 11/2012 |
| WO | 2013098830 | A1 | 7/2013 |
| WO | 2014210020 | A1 | 12/2014 |
| WO | 2015025189 | A1 | 2/2015 |
| WO | 2015036817 | A1 | 3/2015 |
| WO | 2015044706 | A1 | 4/2015 |
| WO | 2015159131 | A1 | 10/2015 |
| WO | 2016157137 | A1 | 10/2016 |
| WO | 2016189350 | A1 | 12/2016 |
| WO | 2018104834 | A1 | 6/2018 |
| WO | 2018170276 | A2 | 9/2018 |
| WO | 2020092426 | A2 | 5/2020 |
| WO | 2020117866 | A1 | 6/2020 |
| WO | 2020148658 | A2 | 7/2020 |
| WO | 2021018312 | A1 | 2/2021 |
| WO | 2021205240 | A1 | 10/2021 |

* cited by examiner

300

Satellite
316

Network Access Node
308

Network
320

API layers
328

332

360

IDP
324

Network Access Node
312

Electronic Device
304

500

Start

504

Monitor API transactions for unknown event

508

Capture output in dynamic record

512

Tag transactions based on principals

516

Group transactions based on common tags

520

Chain transactions based on tags and timestamps

524

Predict unknown event based on chained transactions and identity tags

524

Generate description of unknown event based on prediction

End

SYSTEMS FOR DESCRIBING UNKNOWN ACCESS MANAGEMENT EVENTS USING IDENTITY TAGS AND RELATED TRANSACTION CHAINS

BACKGROUND

Identity and access management (IAM) is a framework of policies and technologies to ensure that the right users have the appropriate access to technology resources. IAM systems identify, authenticate, and control access for individuals who will be utilizing IT resources, as well as hardware and applications needed for access. IAM covers issues such as how users gain an identity, the roles and, sometimes, the permissions that identity grants, the protection of that identity, and the technologies supporting that protection (e.g., network protocols, digital certificates, passwords, etc.). IAM systems, products, applications, and platforms manage identifying and ancillary data about entities that include individuals, computer-related hardware, and software applications. This includes identity providers.

BRIEF DESCRIPTION OF THE DRAWINGS

Detailed descriptions of implementations of the present invention will be described and explained through the use of the accompanying drawings.

Figure 1:
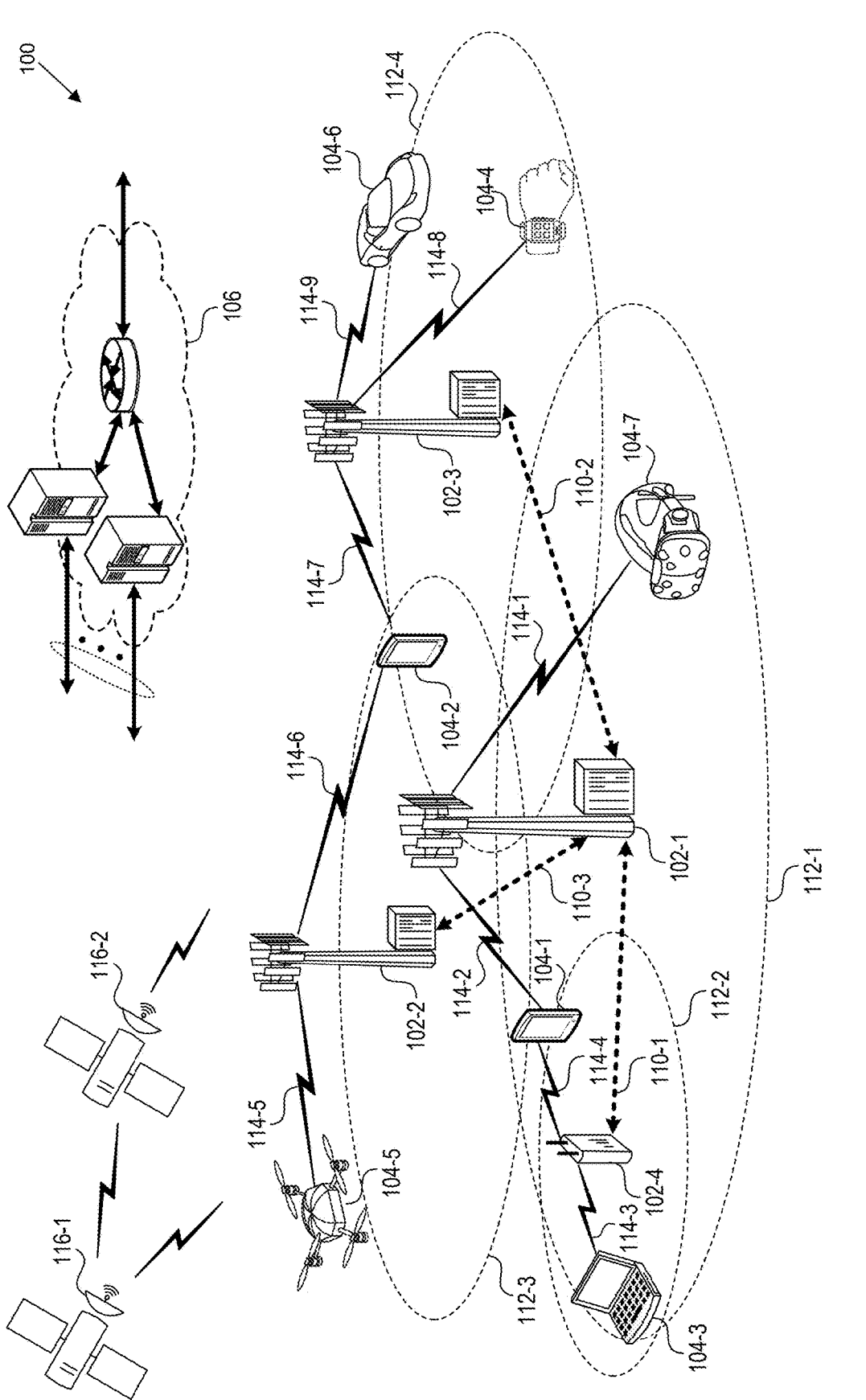
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to describing unknown access management events for an identity provider (IDP). In some implementations, the IDP is a service that controls access to a system and its functions by performing access management events—these events include identifying, authenticating, and controlling a user's degree of access to a system, as well as functions performed by other services comprised by the system. In this application, access management events are also referred to as access events, or, simply, "events." A record of these events is kept for the purpose of preventing fraud, auditing user identities, and building new data-driven services and tools for users of the system. Such services and tools can include Machine Learning (ML) and Artificial Intelligence (AI) applications.

In some implementations, an access event relies on subsidiary Application Programming Interfaces (API) to perform services that are interconnected or interdependent. These subsidiary API services can be referred to as "transactions." For example, in order for a user to add a new phone line to their profile, a first transaction identifies which user is making the request, a second transaction verifies that the user has the proper authority to be granted that request, a third transaction grants the request, and a fourth transaction notifies the user of the granted request. In such examples, the output from one transaction can serve as the input for one or more other subsidiary APIs. It should be understood that an access management can include more or fewer subsidiary API services, or transactions.

The disclosed technology can provide a solution to the problem presented by current IDP logs, in which the subsidiary API services (i.e., transactions) are either not recorded, or recorded separately. As a result, current IDP logs contain records that are cryptic and unusable to all but a select few experts, and which require a great deal of time and expense to combine the data repositories where transactions are recorded separately. These data repositories are multivarious, comprising their own specific data types, security protocols, APIs, locations, modes of storage, and means of extraction, all of which must be reconciled before the data which they comprise can be combined. The disclosed technology can solve these problems, and others, by continually updating a consolidated record of all transactions performed under an access management event. The disclosed technology can accomplish this by chaining related transactions, and grouping chained transactions according to identity tags. For example, identity tags are related to an originating principal. In an IDP, entities are referred to as principals. Principals can include a person, a user, a subscriber, a computer, a service, or a computational entity, such as a process, or a thread. From the consolidated record of chained transactions with identity tags, the system can create a single comprehensive view of the IDP, arranged chronologically. The single comprehensive view of the IDP can function as a basis for AI and ML applications, for the purpose of continual anomaly detection among access management events, as well as automatic intent prediction, and service recommendation, among others.

The description contained herein, and the associated drawings, are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
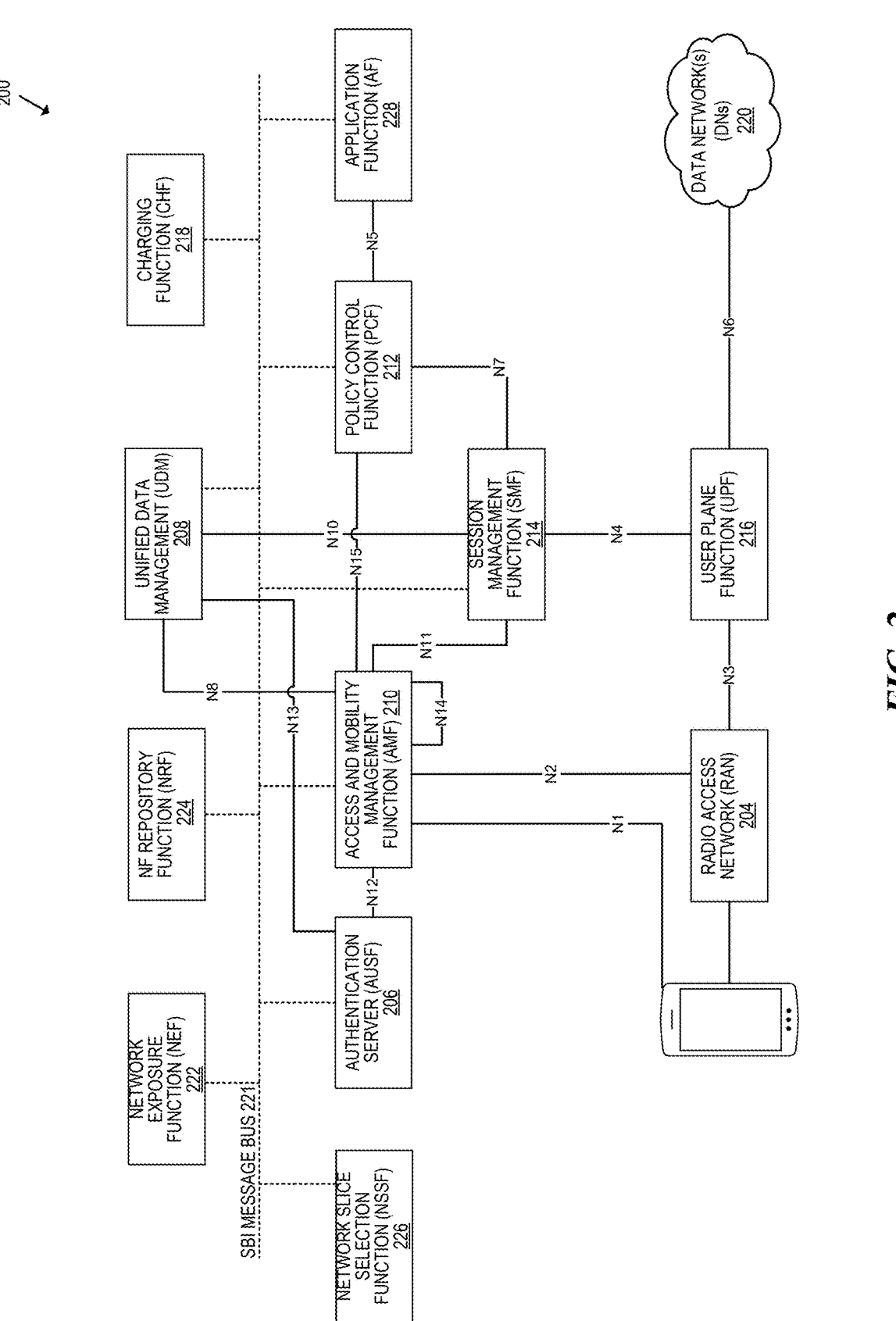
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
FIG. 3 is a block diagram that illustrates a system for contextualizing access management events with identity tags and related transaction chains.

Describing Unknown Access Management Events Using Identity Tags and Related Transaction Chains FIG. 3 is a block diagram that illustrates a system 300 for contextualizing access management events 360 with identity tags and related transaction chains. In some implementations, the system 300 can accomplish this by monitoring transactions 332 performed by layers 328 of an Identity Provider service (IDP) 324 for an unknown access management event 360. Each layer 328 can correspond to a separate Application Programming Interface (API) with its own distinct functionality in the IDP 324.

For example, the transactions 332 can include identification, authentication, adjusting a degree of access to the system 300, and creating a record of the result and of a user associated with the unknown access management event 360. In some implementations, the system 300 belongs to a network 320. For example, the network 320 can be a telecommunications network 320. The user can access the system 300 via an electronic device 304. The user can perform the unknown access management event 360 using the electronic device 304, which can be communicated to the network 320 using one or more network access nodes 308 and 312. In some implementations, the electronic device 304 communicates with a satellite 316 in order to perform the unknown access management event 360 (e.g., verifying user location).

Figure 4A:
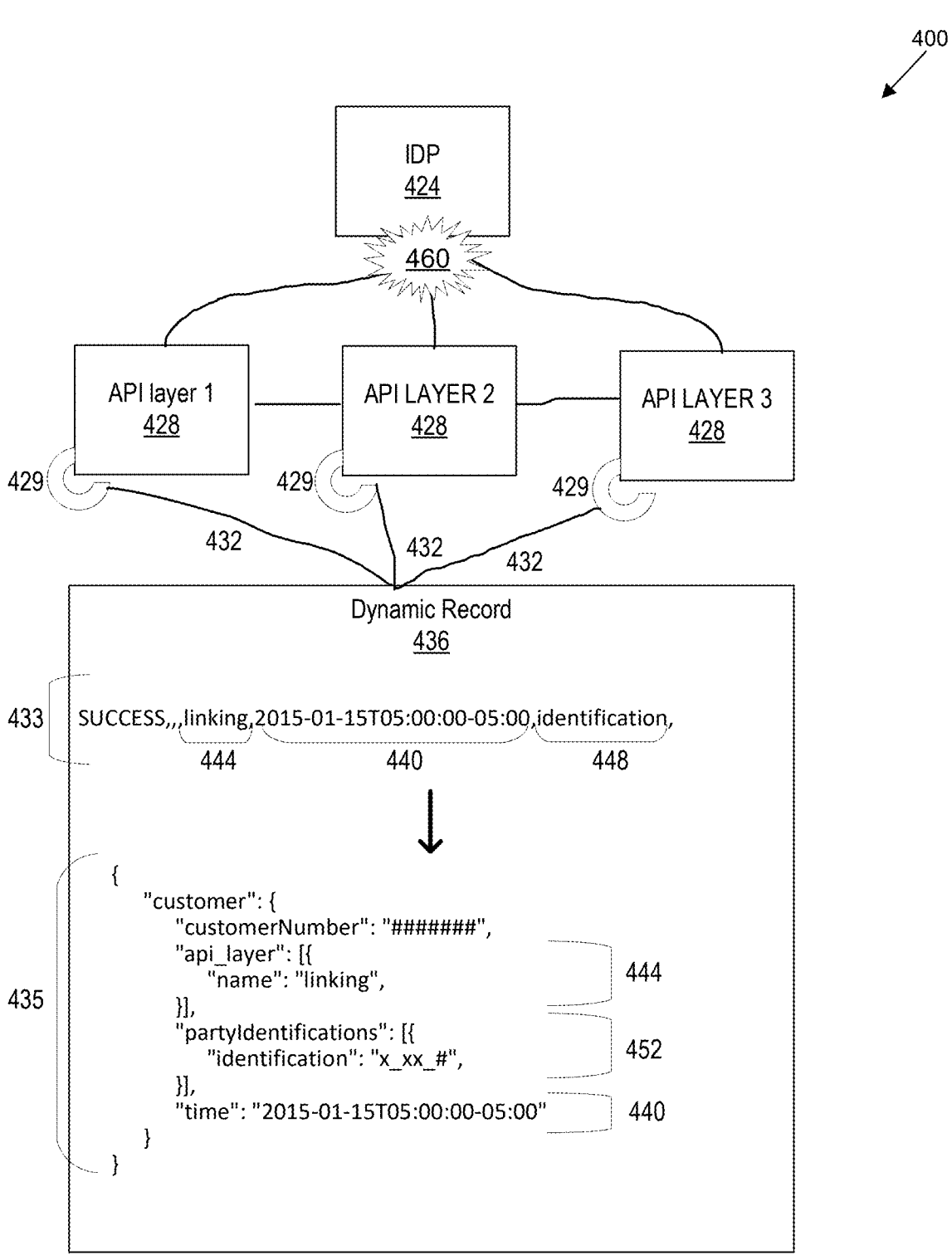
FIG. 4A is a block diagram that illustrates components of a system for components of a system for capturing, tagging, and chaining output from transactions performed by API layers of an IDP.

FIG. 4A is a block diagram that illustrates components of a system 400 for capturing, tagging, and chaining output from transactions 432 performed by API layers 428 of an IDP 424. One purpose of these operations is to describe access management events that include a common purpose for a grouping of chained related transactions, as well as a result and an identity associated with a user who either performs the access management event, or on whose behalf a system expert performs the access management event. In some implementations, the layers 428 can include built-in hooks 429. The built-in hooks 429 can be configured to stream output from transactions 432.

In some implementations, the system 400 captures output from the layers 428 in a dynamic record 436 of transactions 432. For example, the output for each transaction 432 includes a timestamp 440, a name 444 of a layer 428 that performed the transaction, and a principal 448 responsible for calling the layer 428. The output from the layers 428 can be streamed to the dynamic record 436 of transactions 432 using the built-in hooks 429.

In some implementations, the system 400 determines related transactions 432 in the dynamic record 436 by tagging the output for each transaction 432 with identity tags 452 based on the principals 448. For example, the transactions 432 can be grouped based on common identity tags 452. Identity tags can include usernames, IDs, or other unique information associated with a single entity or subscriber to the telecommunications network. The transactions 432 can include user identification, authentication, and granting access to the user to select functions of the 5G Core Network illustrated in FIG. 2.

In some implementations, the principals 448 include source information. The source information can include a user ID, a session ID, a relational ID, a device type, a device ID, an IP address, or a client ID, or any combination or subset of the foregoing. In some implementations, tagging the output for each transaction with identity tags based on the principals 448 also includes parsing the principals for source information. For example, parsing the principals 448 for source information includes determining user profiles that match the source information. This can include searching for the source information in a user profile index or an identity system. In some implementations, the user profiles include identifying information. The system 400 can determine identity tags 452 from the identifying information.

In some implementations, the system 400 chains the related transactions into a list of chained transactions 433 by comparing identity tags 452 and timestamps 440. For example, the system 400 can determine an order for the list of chained transactions 433 based on proximate timestamps 440 (e.g., the system 400 can order the list of chained transactions 433 from first to last).

Figure 4B:
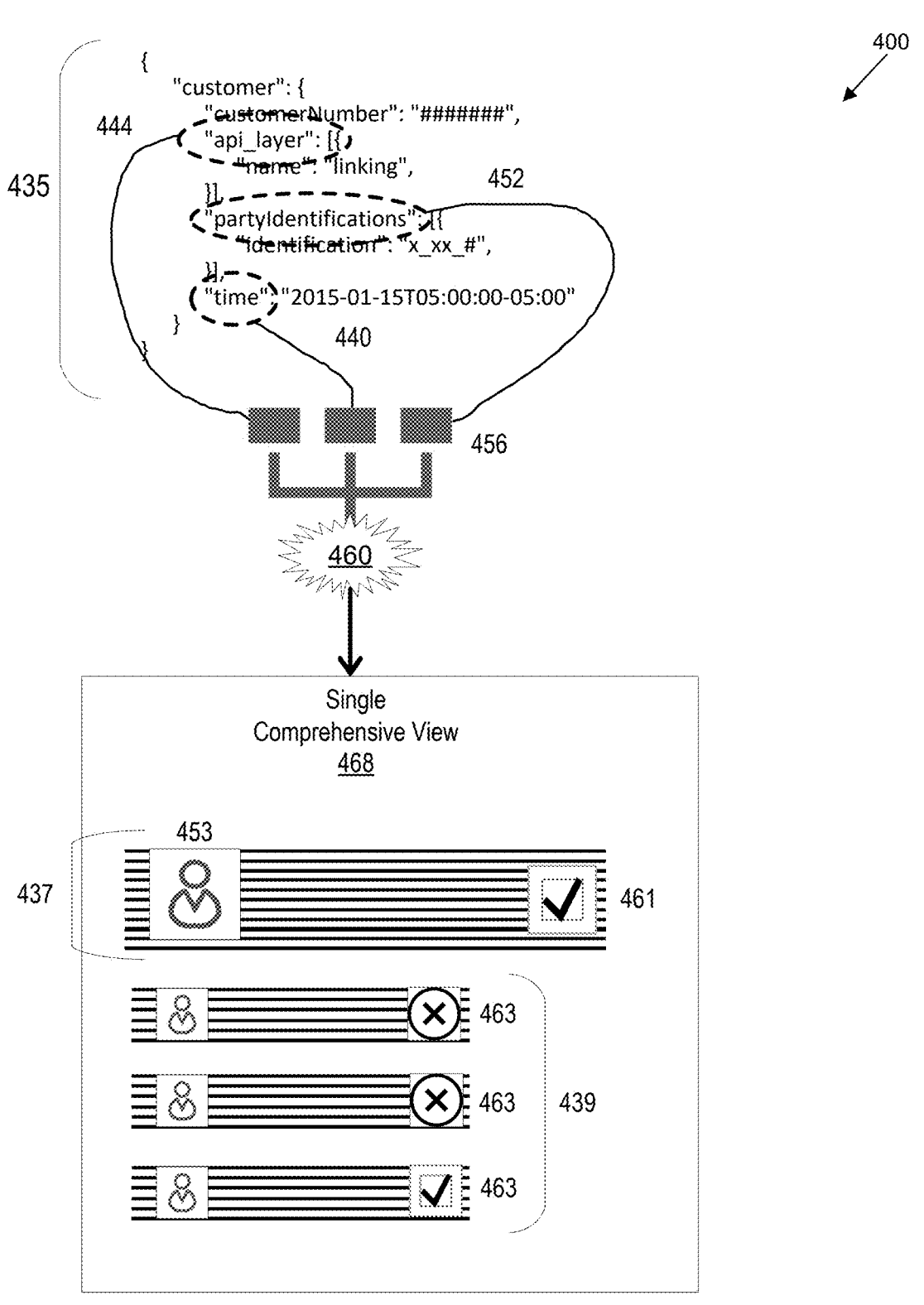
FIG. 4B is a block diagram that illustrates components of a system for describing an unknown access management event using identity tags and related transaction chains.

FIG. 4B is a block diagram that illustrates components of a system 400 for describing an unknown access management event 460 using identity tags and related transaction chains. In some implementations, the system 400 describes an unknown access management event 460 based on the names 444 of the layers 428 of the transactions 432 of the list of chained transactions 433.

In some implementations, the names of the layers that performed the transactions are an intention input. For example, determining the access management event 460 can include providing the names of the layers that performed the transactions as the intention input to an intention prediction model. The intention prediction model can be trained to output predicted intentions based on names of layers provided as intention inputs. In some implementations, the system 400 determines a predicted intention from the intention input. For example, the predicted intention can include a common purpose for the transactions 432, and the system 400 can determine the access management event 460 based on the common purpose and the identity tags 452. The intention prediction model can be trained by system 400 domain experts based on historical logs of transactions. Such historical logs can include the names of transactions arranged into ordered chains, such as the chained lists of related transactions. Each ordered chain of transactions can be associated with an access management event defined by the domain experts.

In some implementations, the system 400 generates a description 437 of the access management event 460, using a model 456 trained to output descriptions 437 based on chained transactions 433 provided as input. The model 456 can be a language model, a large language model (LLM), a deep learning model, or a neural network. The model 456 can include convolutional layers, hidden layers, Long Short Term Memory layers, Transformers, or other attention mechanisms, or any combination of the foregoing.

In some implementations, determining the description of the access management event 460 includes organizing the list of chained transactions 433 into a hierarchically nested set of feature-value pairs 435. The hierarchically nested set of feature-value pairs 435 can include features that are descriptive of the access management event 460, and values that correspond to the features for each transaction 432. For example, the hierarchically nested set of feature-value pairs 435 can act as a description input for the model 456.

In some implementations, the system 400 generates the description 437 for display to an auditor in a single comprehensive view 468 of the IDP 424. The single comprehensive view 468 can be updated as new output is streamed to the dynamic record 436 of transactions 432. The description 437 can provide context for the access management event 460 by identifying a user 453 based on the identity tags 452 and a result 461 based on the access management event 460.

In some implementations, the single comprehensive view 468 includes a historical record of previous descriptions 439 of other access management events performed by the user 453. For example, generating the description 437 for display can include comparing the values of the hierarchically nested set of feature-value pairs 435 against past values of the same features taken from the previous descriptions 439. The past values can be based on past results 463 of previous transactions resulting from prior unknown access management events in the IDP. The system 400 can determine differences between the past values and the values of the current access management event 460, and revise the common purpose of the description 437 based on the differences. For example, a user who frequently provides incorrect passwords when attempting to login from a device with a particular device ID, or a device ID that is associated with their user profile but is not their main device, may have their description revised from being a "potential fraud alert" to being a "failed login." In another example, the historical record of previous descriptions 439 includes a data-before field, a data-change field, and a data-after field. The system can identify a change in the data-change field, compare that change from the data-after field to the data-before field, and determine differences between the data-after field and the data-before field based on the change.

Figure 5:
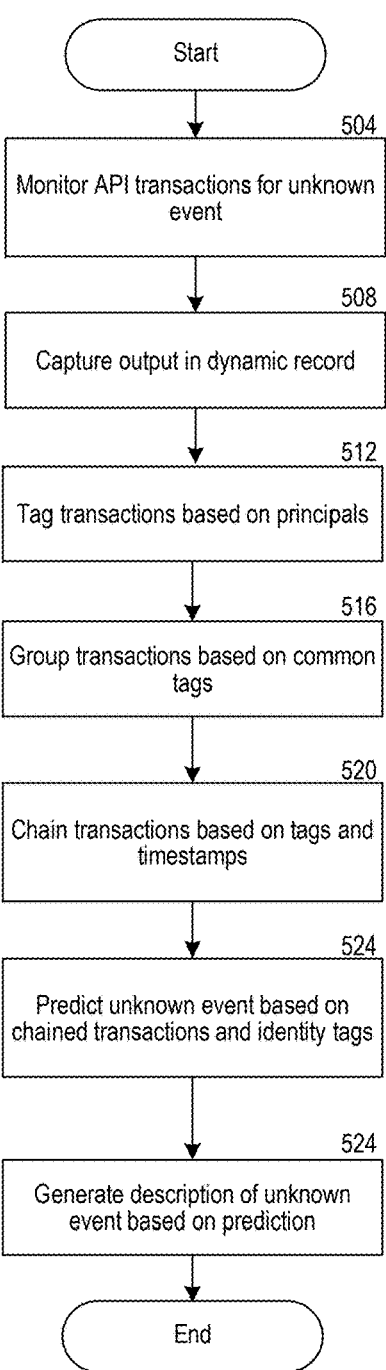
FIG. 5 is a flowchart that illustrates a method to contextualize access management events with identity tags and related transaction chains.

FIG. 5 is a flowchart that illustrates a method 500 to contextualize access management events with identity tags and related transaction chains. The method 500 includes monitoring API transactions for an unknown event (step 504). In some implementations, the API transactions include hooks for streaming output.

The method 500 includes capturing output from the API transactions in a dynamic record (step 508). In some implementations, the output includes timestamps, API names, and principals. For example, the output can be captured by streaming the API transactions to the dynamic record using the hooks. The principals can include source information, which in turn can include user ID, session ID, relational ID, device type, device ID, IP address, or client ID.

The method 500 includes determining related transactions by tagging the transactions with identity tags based on the principals (step 512). In some implementations, tagging can include parsing the principals for source information and determining profiles that match the source information. The profiles can be included within a profile index hosted by a telecommunications network or by a third-party contracted to the telecommunications network. Each profile of the profiles can correspond to a user or a subscriber of the telecommunications network. For example, users and subscribers can include individuals, families, corporations, companies, or trusts. In some implementations, the profiles include information that identifies the user or subscriber that corresponds to the profiles. Matches can be determined by searching for source information in the profile index. Tags can be determined from the identifying information found in the matching profiles.

The method 500 includes grouping transactions based on common tags (step 516). The method 500 includes chaining the related transactions into a list of chained transactions having an order by comparing tags and timestamps and determining proximate timestamps (step 520). The method 500 includes determining a prediction of the unknown event by providing the API names in the order of the chained transactions as an input to a model trained to output predicted events based on ordered API names (step 524). In some implementations, predicting the unknown event includes providing the API names as an input to an intention prediction model trained to output predicted intentions based on API names provided as input. The method 500 can include determining the prediction of the unknown event based on the chained transactions and identity tags.

The method 500 includes generating a description of the unknown event using a model trained to output descriptions based on predicted events (step 528). In some implementations, the method 500 includes generating the description for display to a user in a single view. The description can identify a user and a result based on the prediction.

Computer System

Figure 6:
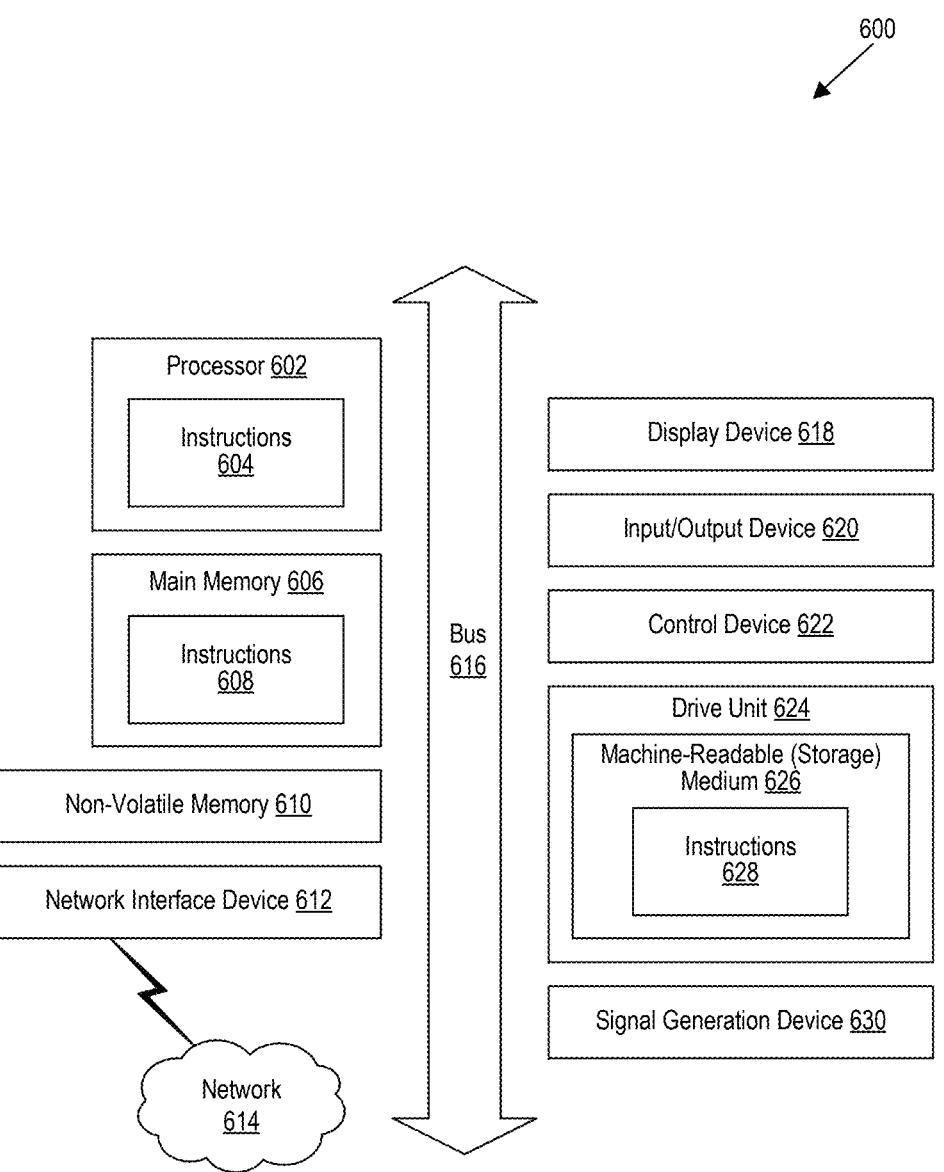
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

receive, at a telecommunications network, an indication of an unknown access management event performed by a user equipment (UE);

record, to a dynamic record, output that are associated with transactions of an Identity Provider (IDP) service of the telecommunications network that are performed by layers of the IDP service in response to the indication of the unknown access management event, wherein each layer corresponds to a separate Application Programming Interface (API) with its own distinct functionality in the IDP service of the telecommunications network;

wherein the output includes timestamps of the transactions, names of layers that performed the transactions, and principals responsible for calling the layers; and wherein the dynamic record comprises multiple recorded outputs that are associated with transactions of the IDP service in response to multiple unknown access management events;

determine related transactions in the dynamic record by tagging the output for the transactions with identity tags based on the principals, and grouping the transactions based on common identity tags;

concatenate the related transactions into a list of concatenated transactions by comparing identity tags and timestamps and determining an order for the list of concatenated transactions based on proximate timestamps;

determine an access management event based on the names of the layers of the transactions of the list of concatenated transactions;

generate a description of the access management event using a large language model (LLM) that is trained to generate descriptions based on concatenated transactions; and cause a display of the description for display to an auditor in a single comprehensive view of the IDP, wherein the single comprehensive view is updated as new output is streamed to the dynamic record of transactions, and wherein the description provides context for the access management event by identifying a user based on the identity tags and a result based on the access management event.

2. The non-transitory, computer-readable storage medium of claim 1, wherein the layers of the IDP service include built-in hooks for streaming output from transactions, and wherein the output from the layers of the IDP service is streamed to the dynamic record of transactions using the built-in hooks.

3. The non-transitory, computer-readable storage medium of claim 1, wherein:

the principals include source information, and the source information includes at least one of:

user ID;

session ID;

relational ID;

device type;

device ID;

IP address; or client ID.

4. The non-transitory, computer-readable storage medium of claim 3, wherein tagging the output for each transaction with the identity tags based on the principals further causes the system to:

parse the principals for the source information;

determine user profiles that match the source information by searching for the source information in a user profile index, wherein the user profiles comprise identifying information; and determine the identity tags from the identifying information.

5. The non-transitory, computer-readable storage medium of claim 1, wherein identifying the access management event further causes the system to:

provide the names of the layers of the IDP service that performed the transactions as an intention input to an intention prediction model, wherein the intention prediction model has been trained to output predicted intentions based on names of layers provided as intention inputs;

determine a predicted intention based on the intention input, wherein the predicted intention includes a common purpose for the transactions; and determine the access management event based on the common purpose and the identity tags.

6. The non-transitory, computer-readable storage medium of claim 5, wherein generating the description of the access management event further causes the system to:

organize the list of concatenated transactions into a hierarchically nested set of feature-value pairs, comprising:

features that are descriptive of the unknown access management event; and values associated with the features for each transaction, wherein the hierarchically nested set of feature-value pairs is input to the LLM to generate the description.

7. The non-transitory, computer-readable storage medium of claim 6, wherein the single comprehensive view comprises a historical record of previous descriptions of access management events performed by the user, wherein the historical record includes a data-before field, a data-change field, and a data-after field, and wherein generating the description for display further causes the system to:
    identify a change in the data-change field;
    compare the change in the data-after field against the data-before field;
    determine differences between the data-after field and the data-before field; and
    revise the common purpose of the description based on the differences.
8. A system comprising:
at least one hardware processor; and
at least one non-transitory memory storing instructions, which, when executed by the at least one hardware processor, cause the system to:
    receive, at a telecommunications network, an indication of an unknown access event performed by a mobile device;
    record, in a dynamic record, output that are associated with transactions performed by separate Application Program Interfaces (APIs),
        wherein the output includes timestamps, names of APIs that performed the transactions, and principals responsible for calling the APIs;
    determine related transactions by tagging the output with identity tags based on the principals, and grouping the transactions into the related transactions based on common identity tags;
    concatenate the related transactions into a list of concatenated chained transactions by comparing the timestamps and determining an order for the list of concatenated transactions based on proximate timestamps;
    identify an access event based on the names of the APIs that performed the transactions of the list of concatenated transactions;
    compose a description of the access event using an artificial intelligence model trained to output descriptions based on concatenated transactions as input; and
    generate the description for display to an auditor in a comprehensive view of the transactions,
        wherein the description identifies a user and a result based on the access event.
9. The system of claim 8, wherein the APIs include built-in hooks for streaming output from transactions, and wherein the output from the APIs is streamed to the dynamic record using the built-in hooks.
10. The system of claim 8, wherein:
the principals include source information, and
the source information includes at least one of:
    user ID,
    session ID,
    relational ID,
    device type,
    device ID,
    IP address, or
    client ID.
11. The system of claim 10, wherein tagging the output for each transaction with identity tags based on the principals further causes the system to:

parsing the principals for the source information;
determining user profiles that match the source information by searching for the source information in a user profile index,
    wherein the user profiles comprise identifying information; and
determining identity tags from the identifying information.
12. The system of claim 8, wherein predicting a common purpose for the list of concatenated transactions further causes the system to:
    providing the names of the APIs that performed the transactions as an input to an intention prediction model,
        wherein the intention prediction model has been trained to output predicted intentions based on names of layers provided as input; and
    determine the access event based on the common purpose and the list of concatenated transactions.
13. The system of claim 12, wherein determining a description of the access event further causes the system to:
    organizing the list of concatenated transactions into a hierarchically nested set of feature-value pairs, comprising:
        features that are descriptive of the unknown access event, and
        values that correspond with the features for each transaction,
            wherein the hierarchically nested set of feature-value pairs acts as an input for the artificial intelligence model.
14. The system of claim 13, wherein the comprehensive view comprises a historical record of previous descriptions of access events performed by the user, and wherein generating the description for display further causes the system to:
    compare the values of the hierarchically nested set of feature-value pairs against past values of the features,
        wherein the past values are associated with the previous descriptions of the historical record;
    determine differences between the values and the past values; and
    revise the common purpose of the description based on the differences.
15. A method comprising:
receiving, at a telecommunications network, an indication of an unknown event from multiple Application Programming Interface (API) transactions;
recording output from the API transactions in a dynamic record, wherein the output includes timestamps, API names, and principals;
determining related transactions by tagging the output with tags based on the principals, and grouping transactions based on common tags;
concatenating the related transactions into a list of concatenated transactions having an order by comparing tags and timestamps and determining proximate timestamps;
predicting the unknown event by providing the API names in the order of the list of concatenated transactions as an input to an artificial intelligence model trained to output predicted events based on ordered API names; and
generating a description of the unknown event using a second artificial intelligence model trained to output descriptions based on concatenated transactions.

16. The method of claim 15, further comprising:
generating the description for display to a user in a single view,
    wherein the description identifies a user and a result based on the prediction.

17. The method of claim 15, wherein the API transactions include hooks for streaming output, and wherein the output from the API transactions is streamed to the dynamic record using the hooks.

18. The method of claim 15, wherein:
the principals include source information, and
the source information includes at least one of:
    user ID,
    session ID,
    relational ID,
    device type,
    device ID,
    IP address, or
    client ID.

19. The method of claim 18, wherein tagging the output for each transaction with tags based on the principals further comprises:
    parsing the principals for the source information;
    determining profiles that match the source information by searching for the source information in a profile index, wherein the profiles comprise identifying information; and
    determining tags from the identifying information.

20. The method of claim 15, wherein predicting of the unknown event further comprises:
    providing the API names as an input to an intention prediction model,
        wherein the intention prediction model has been trained to output predicted intentions based on API names provided as input; and
    predicting the unknown event based on the API names.

\*   \*   \*   \*   \*